(12) United States Patent
Teverovskiy et al.

(10) Patent No.: US 11,970,595 B2
(45) Date of Patent: Apr. 30, 2024

(54) PARTIALLY FLUORINATED SULFONAMIDE FOR USE IN PET FILMS

(71) Applicant: 3M INNOVATIVE PROPERTIES COMPANY, St. Paul, MN (US)

(72) Inventors: Georgiy Teverovskiy, St. Paul, MN (US); Maria A. Appeaning, St. Paul, MN (US); Derrick M. Poirier, Woodbury, MN (US); Troy J. Anderson, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/269,726

(22) PCT Filed: Dec. 23, 2021

(86) PCT No.: PCT/IB2021/062261
§ 371 (c)(1),
(2) Date: Jun. 26, 2023

(87) PCT Pub. No.: WO2022/144724
PCT Pub. Date: Jul. 7, 2022

(65) Prior Publication Data
US 2024/0076474 A1 Mar. 7, 2024

Related U.S. Application Data

(60) Provisional application No. 63/132,126, filed on Dec. 30, 2020.

(51) Int. Cl.
*C09J 133/00* (2006.01)
*C08K 5/435* (2006.01)
*C09J 7/38* (2018.01)
*C09J 7/40* (2018.01)

(52) U.S. Cl.
CPC ............... *C08K 5/435* (2013.01); *C09J 7/385* (2018.01); *C09J 7/401* (2018.01); *C09J 2301/122* (2020.08); *C09J 2433/00* (2013.01); *C09J 2467/005* (2013.01); *Y10T 428/1476* (2015.01)

(58) Field of Classification Search
None
See application file for complete search history.

(56) References Cited

U.S. PATENT DOCUMENTS

| | | |
|---|---|---|
| 2,532,011 A | 11/1950 | Dahlquist et al. |
| 4,619,976 A | 10/1986 | Morris et al. |
| 4,843,134 A | 6/1989 | Kotnour et al. |
| 5,110,667 A | 5/1992 | Galick et al. |
| 5,411,576 A | 5/1995 | Jones et al. |
| 5,451,622 A | 9/1995 | Boardman et al. |
| 5,690,949 A | 11/1997 | Weimer et al. |
| 5,898,046 A | 4/1999 | Raiford et al. |
| 5,977,390 A | 11/1999 | Raiford et al. |
| 6,114,419 A | 9/2000 | Liss et al. |
| 6,288,157 B1 | 9/2001 | Jariwala et al. |
| 7,396,866 B2 | 7/2008 | Jariwala et al. |
| 10,731,056 B2 | 8/2020 | Teverovskiy et al. |

FOREIGN PATENT DOCUMENTS

| | | |
|---|---|---|
| EP | 0592884 B1 | 1/1999 |
| EP | 1000184 B1 | 8/2003 |
| EP | 3357946 A1 | 8/2018 |
| WO | 2017100045 A1 | 6/2017 |
| WO | 2017189215 A1 | 11/2017 |
| WO | 2017210006 A1 | 12/2017 |
| WO | 2018005285 A1 | 1/2018 |
| WO | 2018048675 A1 | 3/2018 |
| WO | 2018093623 A1 | 5/2018 |
| WO | 2018169642 A1 | 9/2018 |
| WO | 2018229596 A1 | 12/2018 |
| WO | 2019195145 A1 | 10/2019 |

OTHER PUBLICATIONS

International Search Report for PCT International Application No. PCT/IB2021/062261, dated Mar. 17, 2022, 4 pages.
Katritzky, "Design And Synthesis of Novel Fluorinated Surfactants for Hydrocarbon Subphases", Langmuir, 1988, vol. 04, No. 03, pp. 732-735.
Pocius, "Adhesion and Adhesives Technology: An Introduction", 2nd Edition, Book Review, 2002, 1 page.

*Primary Examiner* — Anish P Desai

(57) ABSTRACT

Silicone-free extruded release liner for acrylic adhesives that is stable at high temperatures, has advantageous surface energy characteristics, has minimal impact on adhesive performance, and has minimal environmental impact comprising a composition that includes a thermoplastic polymer and a fluoroadditive represented by the structure (I), wherein X is a meta-substituted or a para-substituted benzene ring and each n is independently a whole number from 0 to 3, inclusive. Methods of preparing the composition, the fluoroadditive, and the release liner.

16 Claims, No Drawings

PARTIALLY FLUORINATED SULFONAMIDE FOR USE IN PET FILMS

CROSS REFERENCE TO RELATED APPLICATIONS

This application is a national stage filing under 35 U.S.C. § 371 of PCT/IB2021/062261, filed Dec. 23, 2021, which claims the benefit of Provisional Application No. 63/132,126, filed Dec. 30, 2020, the disclosure of which is incorporated by reference in its/their entirety herein.

TECHNICAL FIELD

The present disclosure broadly relates to thermoplastic compositions including partially fluorinated sulfonamides.

BACKGROUND

According to the Pressure-Sensitive Tape Council, pressure-sensitive adhesives ("PSAs") are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties.

These requirements for pressure-sensitive adhesives are assessed generally by means of tests which are designed to individually measure tack, adhesion (i.e., peel strength), and cohesion (i.e., shear holding power), as noted by A. V. Pocius in *Adhesion and Adhesives Technology: An Introduction*, 2.sup.nd Ed., Hanser Gardner Publication, Cincinnati, Ohio, 2002. These measurements taken together constitute the balance of properties often used to characterize a PSA.

One important class of pressure-sensitive adhesives include those with a (meth)acrylate copolymer as the elastomeric material. The (meth)acrylate copolymers can be used alone or can be combined with tackifiers to provide the desired adhesive properties. Tackifiers can be added, for example, to alter the rheology and compliance of the adhesive composition, to change the surface energy of the adhesive composition, and to alter the melt processing characteristics of the adhesive composition.

Articles having release characteristics may be used in a variety of applications. For example, adhesive-coated articles (e.g., coated with a pressure-sensitive-adhesive), such as tapes, die-cuts, labels, and the like, often employ a release coating as a part of their structure. The purpose of the release coating is typically to provide a surface to which the adhesive coating does not permanently adhere.

SUMMARY

The present disclosure is directed to a silicone-free extruded release liner for acrylic adhesives that is stable at high temperatures, has minimal impact on adhesive performance, and has minimal environmental impact.

Provided herein in one aspect is a composition including a thermoplastic polymer and a fluoroadditive represented by the structure

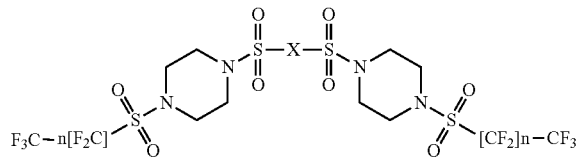

where X is an arylene group and each n is independently a whole number from 0 to 3, inclusive.

In another aspect, provided is a method of preparing the above composition.

As used herein:

"Arylene" means a polyvalent, aromatic, such as phenylene, naphthalene, and the like.

Features and advantages of the present disclosure will be further understood upon consideration of the detailed description as well as the appended claims.

DETAILED DESCRIPTION

Release coatings have been applied to surfaces by preparing the release components in solvent, coating the solution onto a desired surface, and drying to evaporate the solvent. One example of a release coating formed using a conventional solvent-based process is disclosed in U.S. Pat. No. 2,532,011 (Dahlquist et al.). Such solvent-based processes, however, have become increasingly less desirable due to special handling concerns associated therewith. Furthermore, conventional release materials are typically applied to a substrate in a coating step that is separate from the preparation of the substrate itself. In the present disclosure, the preparation of the substrate (i.e., backing) can be carried out simultaneously with the preparation of the release surface in a solventless co-extrusion process.

Partially fluorinated small molecule additives are known and used as Polymer Melt Additives ("PMAs") in polypropylene, polyester, and polyamide co-extrusion. These PMAs impart, for example, static and dynamic water and oil repellency and soil resistance to the resulting nonwovens, fibers, and fabrics. However, currently available PMAs such as those disclosed, for example, in U.S. Pat. No. 5,977,390 (Raiford et al.), U.S. Pat. No. 5,898,046 (Raiford et al.), and U.S. Pat. No. 7,396,866 (Jariwala et al.), may require the use of expensive raw materials, may lack durability when used in polymers other than polypropylene, and may not meet the desired performance criteria for low surface-energy applications.

U.S. Pat. No. 5,451,622 (Boardman, et al.) discloses the use of partially fluorinated amides in thermoplastic polymers to impart water and oil repellency to shaped articles, such as fibers and films and to thermoplastic mixtures of fluorochemical and thermoplastic polymer, such as polypropylene, and to the shaped articles thereof, such as fibers and films. The incorporation of a partially fluorinated small molecule can allow for in situ functionalization of a bulk material, which may obviate the need for post-processing steps, such as, for example, UV cure and thermal treatment. Such modification may be exemplified in bulk polymer co-extrusions, coatings utilizing a polymeric binder, or combinations thereof. A series of 1-((perfluorobutyl)sulfonyl) piperazine ("PBSP") containing amides and diamides have been developed for use in the surface modification of bulk polymers and are disclosed, for example, in PCT WO2017100045 (Teverovskiy, et al.) and U.S. Pat. No. 10,731,056 (Teverovskiy, et al.). Furthermore, partially fluorinated small molecule additives have found utility as release materials for pressure sensitive adhesives for e-beam-stable release as coatings and are being investigated as low-adhesion backings and premium release liners in solid state/co-extrusion formulations to provide, inter alia, minimal-transfer liners for silicone adhesives enabling premium release features with minimal impact to adhesive performance and environment.

In one aspect, provided is a composition including a thermoplastic or thermoset polymer and a fluoroadditive represented by Formula I

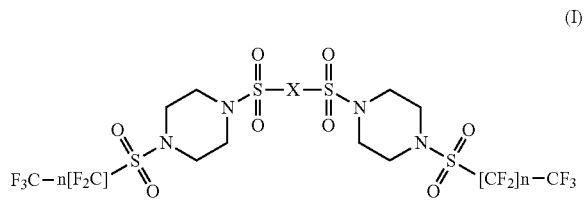

(I)

where X is an arylene group and each n is independently a whole number from 0 to 3, inclusive. In some preferred embodiments, the arylene group is a meta-substituted or a para-substituted phenylene ring. In some preferred embodiments the phenylene ring is a meta-substituted benzene ring. In some preferred embodiments n is 3. Fluoroadditives useful in embodiments of the present disclosure may be prepared by methods known to those of ordinary skill in the relevant arts.

Polymers useful in embodiments of the present disclosure may include both thermoplastic and thermoset polymers. Preferred thermoplastic polymers include polyesters, such as, for example, polyethylene terephthalate, polybutylene terephthalate, polyphenylene terephthalates, as well as renewable and biogradable polyesters, such as those derived polylactide ("PLA") and polybutylenesuccinate ("PBS"), polymers derived from copolyester resins available under the trade designation SPECTAR from Eastman Chemical Company, Kingsport, Tennessee, USA and combinations thereof.

A polymer composition of the present disclosure can be melted or shaped, for example by extrusion or molding, to produce shaped articles, such as fibers, films and molded articles whose surfaces exhibit excellent oil- and water repellency. The repellent polymer composition is especially useful in the preparation of nonwoven fabrics used in medical gowns and drapes, where repellency to bodily fluids is mandated. Films made from repellent polymer compositions of this invention are useful, for example, for moisture and/or grease-resistant packaging, release liners, and multilayer constructions.

Shaped articles (e.g., fibers, films and molded or extruded articles) prepared from compositions of the present disclosure can be made, e.g., by blending or otherwise uniformly mixing the fluoroadditive of Formula I and the polymer, for example by intimately mixing the fluoroadditive with pelletized or powdered polymer, and melt extruding the mixture into shaped articles such as pellets, fibers, or films by known methods. The fluoroadditive can be mixed per se with the polymer or can be mixed with the polymer in the form of a "masterbatch" (i.e., concentrate) of the fluoroadditive in the polymer. Masterbatches typically contain from about 10% to about 25% by weight of the fluorochemical additive. Also, an organic solution of the fluoroadditive may be mixed with the powdered or pelletized polymer, the mixture dried to remove solvent, then melted and extruded into the desired shaped article. Alternatively, molten fluoroadditive (as a compound(s) or masterbatch) can be injected into a molten polymer stream to form a blend just prior to extrusion into the desired shaped article. When using thermoset resins, such as epoxy resins, urethanes and acrylates, the fluoroadditive may be mixed with the resin and cured by application of heat. Preferably such thermoset resins may be processed by reactive extrusion techniques such as are taught in U.S. Pat. No. 4,619,976 (Kotnour) and U.S. Pat. No. 4,843,134 (Kotnour).

Thermoplastic compositions containing the compounds of Formula I (i.e., fluoroadditive) may be used to provide release properties to films. The disclosed fluoroadditives are melt processible, i.e., suffer substantially no degradation under the melt processing conditions used to form the films. The amount of fluoroadditive in the composition is that amount sufficient to produce a shaped article having a surface with the desired release properties. Preferably, the amount of fluoroadditive will be that amount which provides from about 100 to 10,000 ppm fluorine, more preferably 200 to 5000 ppm, most preferably 350 to 600 ppm fluorine, based on the weight of the shaped article. Thermoplastic compositions containing the compounds of Formula I may commonly include 0.1 wt. % to 10 wt. %, optionally, 0.5 wt. % to 7 wt %, optionally 1 wt. % to 3 wt. % of the fluoroadditive.

The present disclosure focuses on the development of a silicone-free extruded release liner for acrylic adhesives that is stable at high temperatures, has advantageous surface energy characteristics, has minimal impact on adhesive performance (silicone-containing release liners may transfer silicone material and can negatively impact end use case), and has minimal environmental impact.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, materials used in the examples were obtained from commercial suppliers (e.g., Aldrich Chemical Co., Milwaukee, Wisconsin) and/or made by known methods. Materials prepared in the examples were analyzed by NMR spectroscopy and were consistent with the given structures.

Materials Used in the Examples

| Abbreviation | Description and Source |
|---|---|
| GSA3 60/40 Adhesive | A solvent-free, high-tackifier, gentle-to-skin silicone adhesive prepared according to the procedure in published PCT application WO2019195145A1 |
| PTA Clear 62 | PET resin available as product code 41-5599-0286-5 from 3M Company, St. Paul, Minnesota |

| Abbreviation | Description and Source |
|---|---|
| PETg | PET available under the trade designation "EASTAR GN071" from Eastman Chemical Company, Kingsport, Tennessee |
| PCTg | Copolyester resin obtained under the trade designation "SPECTAR CLEAR COPOLYESTER VM318" from Eastman Chemical Company, Kingsport, Tennessee |
| Piperazine | Piperazine, can be obtained from Millipore Sigma, Burlington, Massachusetts |
| Triethylamine | Triethylamine, can be obtained from Millipore Sigma, Burlington, Massachusetts |
| NFBSF | 1,1,2,2,3,3,4,4,4-nonafluorobutane-1-sulfonyl fluoride, can be obtained from Millipore Sigma, Burlington, Massachusetts |
| N,N-diisopropylethylamine | N,N-diisopropylethylamine, can be obtained from Millipore Sigma, Burlington, Massachusetts |
| Terephthaloyl chloride | Terephthaloyl chloride, can be obtained from Millipore Sigma, Burlington, Massachusetts |
| Isophthaloyl dichloride | Isophthaloyl dichloride, can be obtained from Millipore Sigma, Burlington, Massachusetts |
| Benzene-1,3-disulfonyl chloride | Benzene-1,3-disulfonyl chloride, can be obtained from Millipore Sigma, Burlington, Massachusetts |

Test Methods

Release Force of Adhesive Test Tape from Release Liner

The release force between the release liner and the Adhesive Test Tape of a laminate construction was measured using a 180-degree peel geometry according to the manufacturer's instructions as follows. An IMASS SP 2100 peel force tester (IMASS, Incorporated, Accord, Massachusetts) equipped with a 5.0-pound (2.27-kg) load cell was employed using the following parameters: Procedure A: a 1 inch (2.54 centimeters) wide test specimen, a peel rate of 90 inches/minute (229 cm/min), a 1 second delay before data acquisition, and a 5 second averaging time (the average of two test specimens was reported in grams/cm); and Procedure B: a 1 inch (2.54 centimeters) wide test specimen, a peel rate of 1500 inches/minute (3750 cm/min), a 0.1 second delay before data acquisition, and a 0.2 second averaging time (the average of two test specimens was reported in grams/cm).

Testing was done according to the following conditions: A) five days at 22° C. (72° F.) and 50% relative humidity; and B) four days at 50° C., followed by an equilibration at 22° C. (72° F.) and 50% relative humidity for a minimum of 24 hours before testing.

Determination of F Surface Concentration Via XPS

The example surfaces were examined using X-ray Photoelectron Spectroscopy ("XPS") also known as Electron Spectroscopy for Chemical Analysis ("ESCA") at an approximate photoelectron takeoff angle of 45° unless otherwise stated.

Preparatory Examples

Preparation of Gentle-to-Skin Tape

The GSAs ("Gentle-to-Skin Adhesives") constructions were produced by extrusion compounding and direct coating of 60:40, Silicone Fluid:MQ (AK1000K:803 SQ TF) onto Sontara blue backings using a rotary rod die at a thickness of 4 mils.

Preparation of 1-(1,1,2,2,3,3,4,4,4-nonafluorobutylsulfonyl)piperazine ("NFBSP")

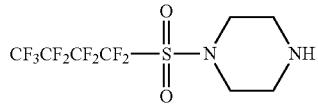

To a 3-neck, 3 L round bottom flask equipped with a mechanical stirrer, addition funnel, and a Claisen adaptor with thermocouple and reflux condenser was added piperazine (486 g, 5642 mmol) and triethylamine (400 mL, 2870 mmol). The reaction mixture was heated to 65° C. with continuous stirring. Once the reaction mixture reached 50° C., NFBSF (500 mL, 2780 mmol) was added via addition funnel at such a rate so as to maintain a temperature below 90° C. Upon completion of addition, the temperature was of the reaction mixture was raised to 95° C. and the reaction mixture was allowed to stir for 16 hours. The vessel was cooled to 50° C. and water (300 mL) was added followed by dichloromethane (500 mL). The resulting biphasic mixture stirred for 5 min and then stirring was ceased to allow for phase separation to occur. The bottom phase was removed, washed 3× with water (300 mL), brine (500 mL), and then dried over sodium sulfate (250 g). The resulting yellow solution was gravity filtered prior to the solvent being removed via rotary evaporator and the resulting material distilled at 250 mTorr and 80° C. to afford 713 g of 1-(1,1,2,2,3,3,4,4,4-nonafluorobutylsulfonyl)piperazine as a white solid.

Preparation of para-Substituted Comparative Fluoroadditive (p-CE)

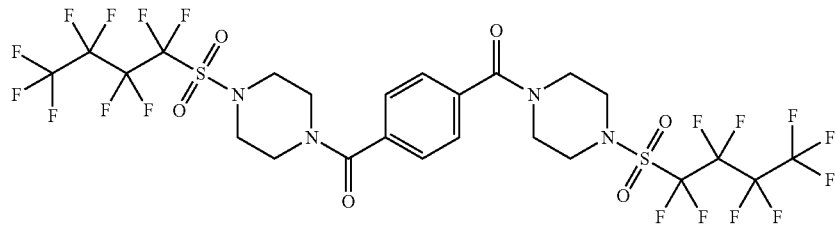

NFBSP (36.47 g, 99.04 mmol), triethylamine (15 mL, 108 mmol) and dichloromethane (120 mL, 1872 mmol) were added to a 500 mL round bottom flask equipped with a magnetic stir bar, reflux condenser and addition funnel containing terephthaloyl chloride (16.8 g, 82.54 mmol) in THF (50 mL) under nitrogen atmosphere. Terephthaloyl chloride solution was slowly added via addition funnel to the reaction mixture with vigorous stirring. Upon completion, the mixture was allowed to stir for 16 hours at room temperature. Water (300 mL) was then added to the yellow mixture. The product was collected via filtration and further washed with water (500 mL three times) to afford p-CE as a white solid.

Preparation of meta-Substituted Comparative Fluoroadditive (m-CE)

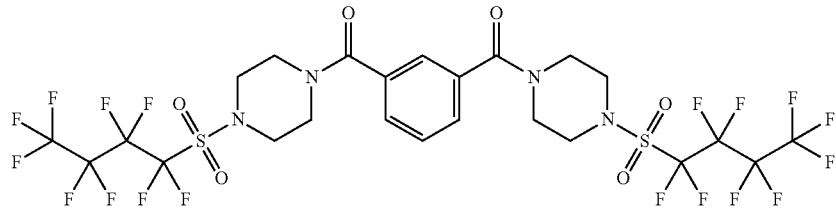

NFBSP (36.47 g, 99.04 mmol), triethylamine (15 mL, 108 mmol) and dichloromethane (120 mL, 1872 mmol) were added to a 500 mL round bottom flask equipped with a magnetic stir bar, reflux condenser and addition funnel containing isophthaloyl dichloride (16.8 g, 82.54 mmol) in THF (50 mL) under nitrogen atmosphere. Isophthaloyl dichloride solution was slowly added via addition funnel to the reaction mixture with vigorous stirring. Upon completion, the mixture was allowed to stir for 16 hours at room temperature. Water (300 mL) was then added to the yellow mixture. The product was collected via filtration and further washed with water (500 mL three times) to afford m-CE as a white solid.

Preparation of Fluoroadditive ("FA")

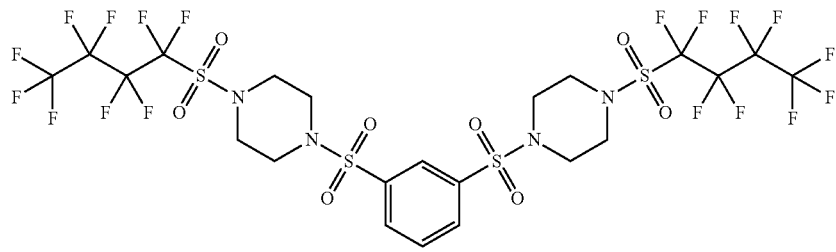

NFBSP (308 g, 836.6 mmol), N,N-diisopropylethylamine (160 mL, 915.7 mmol) and ethyl acetate (832 mL, 8503 mmol) were added to a 2 L round bottom flask equipped with a magnetic stir bar, reflux condenser and addition funnel containing benzene-1,3-disulfonyl chloride (114.5 g, 416.2 mmol) in ethyl acetate (100 mL) under nitrogen atmosphere. The benzene-1,3-disulfonyl chloride solution was slowly added to the reaction mixture with vigorous stirring. Upon completion of addition, the mixture was stirred for 16 hours at room temperature. Water (300 mL) was then added to the mixture and the product was collected via filtration. The product was further washed with water (500 mL three times) to afford FA as a white solid.

Preparation of the Modified (Fluoroadditive) PET Films

Modified PET films of a 36 mil thickness were extruded in a dual layer construction (1:9) top layer to bottom layer respectively. The top layer was co-extruded with fluoroadditive and PCTg with the concentration of fluoroadditive comprising 1.25 wt. % relative to the weight of the entire construction (i.e., 1.25 g fluoroadditive per 100 g (PCTg+ additive), and the bottom layer consisted solely of PTA Clear 62. The films were extruded using an 18 mm twin screw extruder equipped with 3 independent feeders. Feeder A contained the PTA Clear 62 resin pellets for the bottom layer, Feeder B contained PCTg for the top layer, and Feeder C contained FA or CE (meta or para). PET films containing m-CE or p-CE additive are indicated as m-CEF-B or p-CEF-B, respectively. PET films containing FA additive are indicated as EXF-B. Conditions: The 5 inch by 5 inch squares were simultaneously biaxially oriented at a stretching ratio of 3 in the machine direction and 4 in the transverse direction with preheating temperatures at 96° C. for 15 s and thermally set at 232° C. for 15 s.

Comparative example p-CEF-B, m-CEF-B, and example EXF-B were tested according to test methods above. Results are reported in Tables 1 and 2 below.

TABLE 1

Release Force of Gentle-to-Skin Adhesive

| Example | Description of Tape | Release Force (g/cm) Procedure A | | Release Force (g/cm) Procedure B | |
|---|---|---|---|---|---|
| | | Condition A | Condition B | Condition A | Condition B |
| p-CEF-B | GSA3 60:40 | 48.1 | 62.9 | 87.8 | 103.8 |
| m-CEF-B | GSA3 60:40 | 294 | 252 | 590 | Adhesive Failure |
| EXF-B | GSA3 60:40 | 16.8 | 15.8 | 40.8 | 41.1 |

TABLE 2

XPS % F on Surface of Adhesive

| Example | Description of Tape | Percent Surface Fluorine | |
|---|---|---|---|
| | | Condition A | Condition B |
| EXF-B | GSA3 60:40 | 0.03 | 0.09 |

As demonstrated by the data above, inclusion of the FA described herein in PET films significantly decreases the force necessary to de-bond the adhesive from the release liner surface versus p-CEF and m-CEF. Surprisingly, while meta-substitution negatively impacts performance of m-CEF versus p-CEF, EXF meta substitution improves performance.

What is claimed is:

1. A composition comprising:
    a thermoplastic polymer; and
    a fluoroadditive represented by the structure

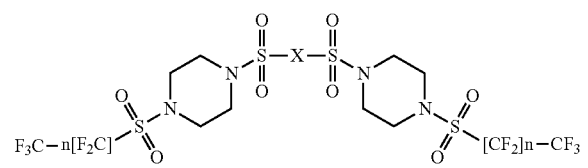

wherein
    X is a meta-substituted or a para-substituted benzene ring; and
    each n is independently a whole number from 0 to 3, inclusive.

2. The composition of claim 1, wherein the thermoplastic polymer comprises a polyethylene terephthalate.

3. The composition of claim 1, wherein the benzene ring is a meta-substituted benzene ring.

4. The composition of claim 1, wherein the n is 3.

5. An extruded article comprising the composition of claim 1.

6. The extruded article of claim 5, wherein the extruded article is a film.

7. A laminate comprising the film of claim 6.

8. The laminate of claim 7 further comprising an adhesive.

9. The laminate of claim 8, wherein the adhesive comprises an acrylic adhesive.

10. The laminate of claim 9, wherein the adhesive is a pressure-sensitive adhesive.

11. A method of preparing a composition, the method comprising:
    combining a thermoplastic polymer with a fluoroadditive to provide the composition, the fluoroadditive represented by the structure

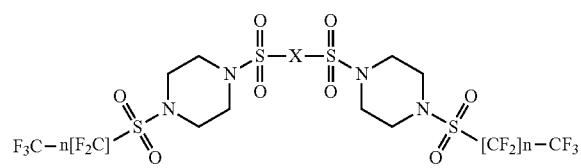

wherein
    X is a meta-substituted or a para-substituted benzene ring; and
    each n is independently a whole number from 0 to 3, inclusive.

12. The method of claim 11, wherein the thermoplastic polymer comprises a polyethylene terephthalate.

13. The method of claim 11, wherein the benzene ring is a meta-substituted benzene ring.

14. The method of claim 11, wherein the n is 3.

15. The method of claim 11, wherein the combining further comprises extruding.

16. The method of claim 11, wherein the composition comprises 0.1 wt. % to 10 wt. % of the fluoroadditive relative to the weight of the entire composition.

* * * * *